MAGNETO-OPTICAL CORRELATOR

Filed April 21, 1967 2 Sheets-Sheet 1

INVENTOR:
Stanton H. Cushner
By [signature]
ATTORNEYS

MAGNETO-OPTICAL CORRELATOR

Filed April 21, 1967 2 Sheets-Sheet 2

INVENTOR:
Stanton H. Cushner
By [signature]
ATTORNEYS 3,500,361

MAGNETO-OPTICAL CORRELATOR

Stanton H. Cushner, Los Angeles, Calif., assignor to The Magnavox Company, a corporation of Delaware Filed Apr. 21, 1967, Ser. No. 632,757
Int. Cl. G11b 5/00
U.S. Cl. 340—174 25 Claims

ABSTRACT OF THE DISCLOSURE

This invention relates to a magneto-optical correlator including at least first and second thin magnetic films and with each thin magnetic film containing magnetic information. The present invention also includes light energy directed to the first thin magnetic film so as to produce rotations in the direction of polarization of the light energy in accordance with the magnetic information contained on the thin magnetic film and with the rotated light energy from the first thin magnetic film directed to the second thin magnetic film for further polarization rotations in the light energy in accordance with the magnetic information contained on the second thin magnetic film so that the total polarization rotations in the light energy is in accordance with a correlation of the magnetic information on the first and second thin magnetic films.

It is often desirable to provide for a correlation between two sets of information so as to determine the relationship between the two sets of information. The term correlation is used in a general sense to include various relationships between the two sets of information. The correlation between the two sets of information provided for where one set of information is a variable and the other set of information is fixed and where the variable set of information is compared to the fixed set of information. Also, the correlation may be provided for where both sets of information are variables. When the sets of information to be compared can be contained on two single tracks, the correlation may be easily accomplished by taking the signals representing the information on the two tracks and comparing the signals electrically. When the sets of information to be compared can be contained only on multiple parallel tracks, it then becomes difficult and very expensive to provide for a correlation on an electrical basis of the signals representing the information on the multiple parallel tracks because of the great complexity of the electrical equipment necessary to produce this correlation.

Since it is often desirable to provide for a correlation of sets of information which can be contained only on multiple parallel tracks, it would be desirable to provide some means for producing a correlation of all of the information at the same time. The present invention is therefore directed to means to provide for the correlation of sets of information which may be contained on multiple parallel tracks at the same time. The correlation of multiple parallel tracks of information can be most easily provided for optically. For example, both sets of information may be used to modify the spatial characteristics of a light beam and the change in spatial characteristics of the light beam may be used as a measurement of the correlation between both sets of information. This type of optical correlation has been accomplished in the prior art by modifying the light beam using transparencies wherein the transparencies have spatial transmission characteirstics in accordance with the sets of information.

The transparencies having the spatial transmission characteristics may be produced photographically. For example, a particular transparency may be produced by photographing the display of a cathode ray tube which is modulated to provide a display representing the multiple parallel tracks of information. The photographing of the display of the cathode ray tube may be continuous so as to produce a continuous transparency which may be processed at a later stage. The processing of the photograph of the display of the cathode ray tube creates a time lag before the transparencies may be used to provide for a modification of the light beam. Although the time lag can be minimized by high-speed processing equipment, the size and complexity of the processing equipment becomes undesirable.

In addition to the above limitations in the use of transparencies to modify the spatial characteristics of a light beam, the transparencies do not produce a true correlation of the information since the transparencies only pass the light beam unaltered when both of the transparencies are transparent at a particular spatial position. For all other conditions the characteristics of the light beam are varied. It would be desirable to provide for the same change in the characteristics of the light beam when the conditions on both transparencies at corresponding spatial positions are alike, for example, when both transparencies at the corresponding spatial positions are either both transparent or opaque.

Other prior art methods of modifying a light beam in accordance with multiple parallel tracks of information may use the Sears-Debye effect in liquids and solids. The Sears-Debye effect is used by applying an acoustical wave having characteristics in accordance with the characteristics of the information to a liquid or solid to modulate a light beam passed through the liquid or solid in accordance with the characteristics of the acoustical wave. However, the light modulators using the Sears-Debye effect are limited as to the available time due to the velocity of the acoustical wave in the material through which the light passes and it is necessary to use large linear expensive optical systems. The above limitations in the various prior art systems tend to remove the savings in cost and volume provided by the use of an optical correlation over the use of an electronic correlation.

The present invention, therefore, is directed to an improved optical correlator using a magneto-optical effect to provide for a spatial modulation of the light beam in accordance with the characteristics of the information. The light modulator uses the Kerr magneto-optical properties of thin magnetic films to provide for the modulation of the light beam. In the Kerr magneto-optical effect used in the magneto-optical correlation of the present invention the magnetization of the thin film is usually parallel to the plane of incidence of the major plane of polarization of the light beam and as the light beam is reflected from the thin magnetic film spatial positions of the light beam are rotated in accordance with the pattern of magnetization on the thin magnetic film.

The magneto-optical correlation of the present invention is produced by using a pair of thin magnetic films and by reflecting the light beam from a first one of the pair of thin magnetic films to a second one of the pair of thin magnetic films. The polarization rotations in the light beam produced from the two thin magnetic films may be made to add or cancel in accordance with the magnetic information contained on the thin magnetic films. As an example, the magnetic information may be of a digital nature and the thin magnetic film may be magnetized in a pattern in accordance with the digital information. The magnetization may be along the easy magnetic axis so that the information is always in one of two directions. The two directions of magnetization may correspond, for example, to a plus and minus value of magnetization and the plus and minus value of magnetization produces opposite directions of rotation of the spatial positions of the light beam when reflected from the thin magnetic film.

When the light beam is reflected from the first thin magnetic film, the light energy at various spatial positions has its polarization rotated in one of two directions in accordance with the magnetization of the corresponding spatial positions on the first thin magnetic film. When the light beam reflected from the first thin magnetic film is directed to the second thin magnetic film, the light beam is reflected from the second thin magnetic film and the light energy at the various spatial positions of the reflected light beam has its polarization further rotated in one of two opposite directions in accordance with the magnetization of the corresponding spatial positions of the second thin magnetic film.

The magneto-optical correlator of the present invention is arranged so that when the direction of magnetization at corresponding spatial positions on both of the thin magnetic films is the same, the rotations add. When the direction of magnetization at corresponding positions on both thin magnetic films are different, the rotations cancel. The magneto-optical correlator of the present invention, therefore, provides for a full correlation where like values on both thin magnetic films at corresponding spatial positions, whether plus or minus, produce rotations which add to each other and where unlike values on both thin magnetic films at corresponding spatial positions produce rotations which cancel each other.

In a particular embodiment of the invention described in this specification, the two thin magnetic films are deposited on optical prisms so that the light energy directed toward the thin magnetic films experiences a total internal reflection due to the optical prisms. The optical prisms may actually be integral with each other so that the integral structure resembles a solid parallelogram. The light energy is usually a collimated beam of linearly polarized light and this collimated beam of polarized light is directed to the first thin magnetic film.

The first thin magnetic film has a spatial magnetic pattern of information provided by a pattern generator. The pattern generator may consist of an ordinary magnetic tape which has been recorded with the proper spatial pattern of magnetic information and with the magnetic tape disposed adjacent to the thin magnetic film so that the magnetic tape induces the spatial pattern of magnetic information onto the thin magnetic film. Other types of magnetic pattern generators which may be used include the use of thermomagnetic material whose spatial magnetic characteristics may be controlled thermally. The thin magnetic film is then positioned adjacent to the thermomagnetic material to receive the magnetic states recorded thermally on the thermomagnetic material.

It is to be appreciated that additional types of magnetic pattern generators may be used to provide for a spatial magnetic pattern on the thin magnetic film.

When the collimated beam of polarized light is reflected from the first thin magnetic film containing the spatial magnetic pattern of information provided by the pattern generator, polarization rotations are produced in the beam of light in accordance with the magnetic pattern contained on the first thin magnetic film upon the reflection of the beam of light from the first thin magnetic film. The light energy reflected from the first thin magnetic film is then directed to the second thin magnetic film which also includes a spatial magnetic pattern of information produced by a magnetic pattern generator. The rotations produced in the collimated beam of polarized light, upon the reflection of the light from the first and second thin magnetic film, either add or cancel each other in accordance with the correlation between the magnetic pattern of information on the first and second thin magnetic films.

The rotated light from the second thin magnetic film which contains the correlation information may now be applied to a detecting apparatus. For example, the entire beam of light may be integrated to provide for the average correlation between the information contained on the first and second thin magnetic films. Also, the light from the second thin magnetic film may be fed to a detector such as a vidicon so as to scan the light beam to produce an output signal representing the instantaneous correlation at various spatial positions within the beam of light which in turn represents the various spatial positions within the patterns of magnetic information contained on the first and second thin magnetic films.

It is to be appreciated that the above described type of correlation may be performed at only two points rather than over an entire area so as to correlate the information contained on two single tracks of information. However, the most useful aspect of the present invention is in using the structure of the present invention to provide a correlation over an entire area since a much greater amount of information may be correlated.

A clearer understanding of the invention will be had with reference to the following description and drawings wherein.

Figures 1, 2:
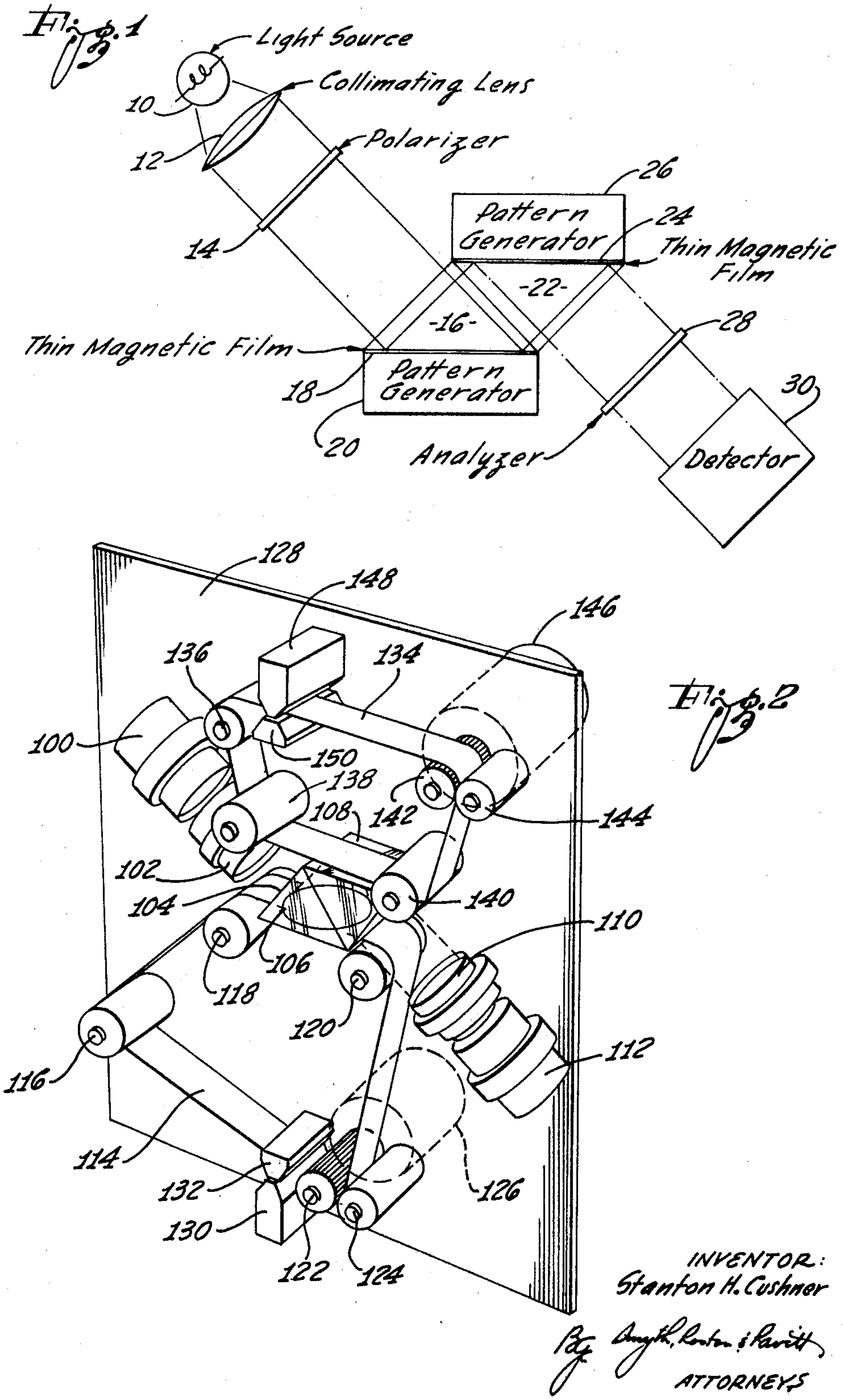
FIGURE 1 is a schematic drawing of a magneto-optical correlator constructed in accordance with the teachings of the present invention.
FIGURE 2 is a specific embodiment of a magneto-optical correlator constructed in accordance with the teachings of the present invention using magnetic tape as a pattern generator.

In FIGURE 1, a source of light energy 10 produces a diverging beam of light energy. The light energy from the source 10 is directed to a collimating lens 12 so as to produce a collimated beam of light energy. The collimated beam of light energy is directed to a polarizer 14 which polarizes the collimated beam of light energy so that the incident direction of polarization of the light beam is parallel to the direction of magnetization of the thin magnetic film to be described later.

The collimated beam of polarized light is directed through an optical prism 16 and the optical prism 16 supports on one surface a thin magnetic film 18. The thin magnetic film 18 includes a spatial pattern of magnetic information which is produced by a magnetic pattern generator 20. The optical prism is used so that the beam of polarized light directed toward the thin magnetic film 18 undergoes a total internal reflection.

The collimated beam of polarized light is reflected from the thin film 18 and polarization rotations are produced in the collimated beam of light in accordance with the spatial magnetic pattern contained on the thin magnetic film 18. The reflected light from the thin magnetic film 18 is directed through a second optical prism 22 which supports a second thin magnetic film 24. The second thin magnetic film 24 also includes a spatial pattern of magnetic information which spatial pattern of magnetic information is produced by a pattern generator 26. Again, the optical prism 22 eliminates refraction problems and, in addition, provides for a total internal reflection of the light energy directed toward the thin magnetic film 24 from the thin magnetic film 18.

The collimated beam of polarized light which has polarization rotations in accordance with the spatial pattern of magnetic information contained on the first thin film 18 has its polarization further rotated in accordance with the spatial pattern of magnetic information contained on the second thin magnetic film 24. The light energy from the second thin magnetic film 24 is then directed to an analyzer 28 which is set so as to provide for intensity changes in the light energy in accordance with the polarization rotations contained in the beam of light energy. Finally, the light energy from the analyzer 28 is applied to a detector 30 for producing an output signal in accordance with the correlation of the magnetic information contained on the first and second thin magnetic films. The detector 30 may be a photodetector which integrates the beam of light from the analyzer 28 so as to provide for an average correlation of the magnetic information contained on the first and second thin magnetic films. In addition, the detector 30 may be a vidicon which scans the light beam so as to provide for an instantaneous point by point correlation of the magnetic information contained on the first and second thin magnetic films.

Figure 3:
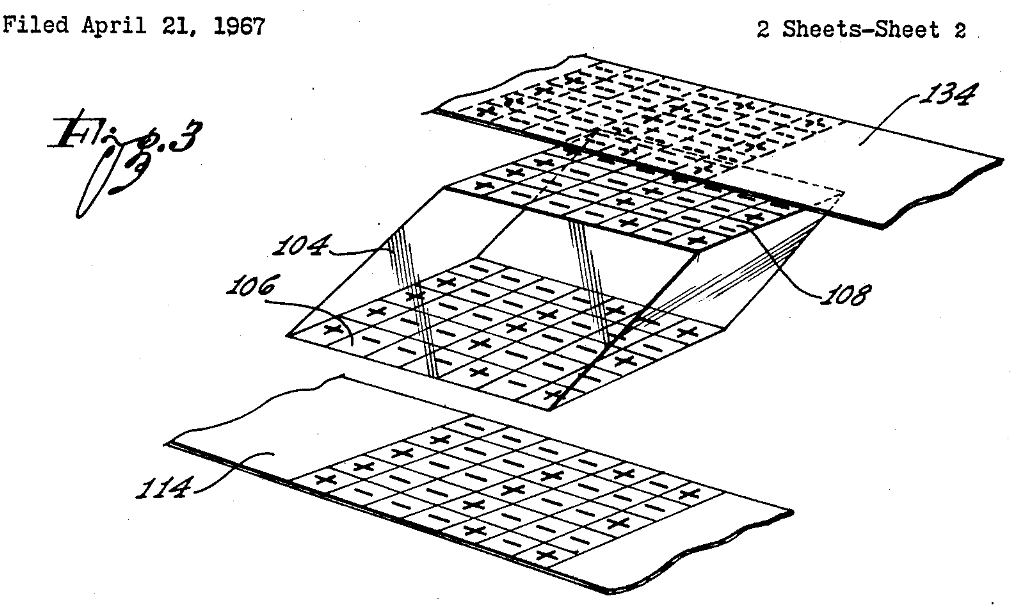
FIGURE 3 illustrates the generation of the magnetic pattern from the magnetic tape on the thin magnetic film.
Figure 4:
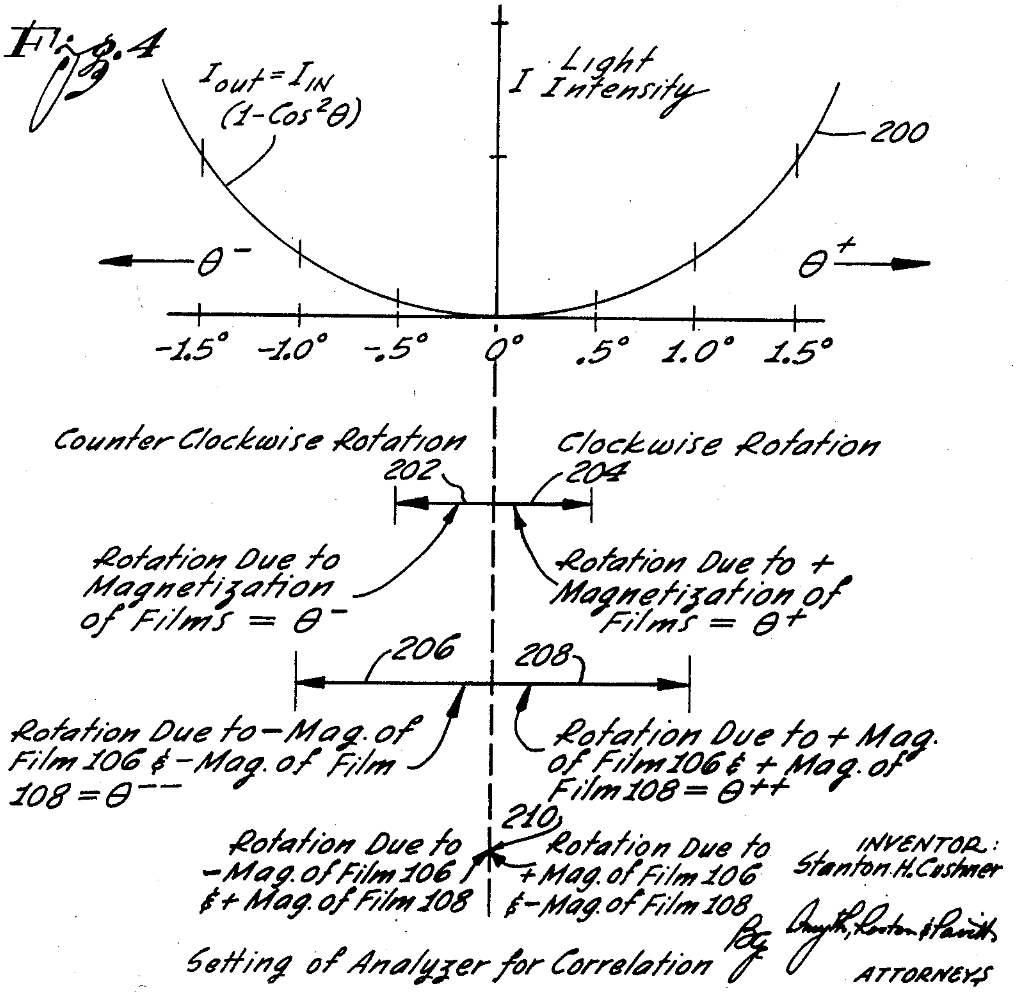
FIGURE 4 illustrates the rotation of the light energy from the magneto-optical correlator of the present invention so as to provide for the correlation of the information.

A clearer understanding of the magneto-optical correlator of the present invention will be had with reference to FIGURES 2, 3 and 4 which illustrate a particular embodiment of a magneto-optical correlator constructed in accordance with the teachings of the present invention.

In FIG. 2, an illuminator 100 produces a beam of collimated light. The illuminator may consist of a light source and a collimating lens. The collimated beam of light is passed through a polarizer 102 which is adjusted so that the first plane of polarization of the beam of light is parallel to the magnetization of the thin magnetic film to be described later. The collimated beam of polarized light from the polarizer 102 is directed to a dual magneto-optical prism 104. The dual magneto-optical prism 104 is in the shape of a solid parallelogram and may be considered to be equivalent to the pair of magneto-optical prisms as shown in FIGURE 1.

The dual magneto-optical prism 104 supports two thin magnetic films 106 and 108 on opposite surfaces. The collimated beam of polarized light is reflected from each of the thin magnetic films 106 and 108 in turn and rotations are produced in the collimated beam of polarized light in accordance with the spatial patterns of magnetic information contained on the first and second thin magnetic films 106 and 108. The rotated light energy reflected from the thin magnetic film 108 is then directed to an analyzer 110 which is adjusted so as to provide for a variable amplitude light signal having variations in amplitude in accordance with the rotations produced by the correlation between the patterns of spatial magnetic information on the thin films 106 and 108. The variable intensity light signal from the analyzer 110 is then applied to a photo receiver 112 which may be designed to provide for an average of the variable amplitude light signal so as to produce an output signal having characteristics in accordance with the correlation between the magnetic information on the thin films 106 and 108.

It is to be appreciated that the photo receiver 112 may be composed of a plurality of small photo receivers arranged in a matrix so as to provide for a correlation of individual bits of information or tracks of information on the thin films 106 and 108. It is also to be appreciated that the light source 100 may be composed of a plurality of small light sources each having a collimator and polarizer so as to use small inexpensive components to cover a large area.

The spatial patterns of magnetic information on the thin films 106 and 108 are produced by pattern generators and the pattern generators include loops of magnetic tape. A first loop of magnetic tape 114 passes adjacent to the first thin film 106 over a series of guide rollers 116, 118 and 120. The final portion of the support for the loop of magnetic tape 114 includes a capstan 122 and an idler wheel 124. The capstan 122 is driven by a tape drive motor 126. The tape drive motor 126 is shown in dotted lines behind the supporting plate 128. As the capstan 122 is rotated by the motor 126, the tape 114 is driven across the face of the thin magnetic film 106 and the pattern of magnetic information contained on the magnetic tape 114 induces a corresponding magnetic pattern on the thin film 106. The pattern of magnetic information is supplied to the magnetic tape 114 by a magnetic write head structure 130. The magnetic write head structure may include a plurality of recording heads so as to record a plurality of tracks of information. A supporting member 132 insures adequate contact between the write head structure 130 and the magnetic tape 114.

A second pattern generator is used to provide a pattern of magnetic information on the second thin film 108 and the second pattern generator includes a loop of magnetic tape 134 and a series of guide rollers 136, 138 and 140. A capstan 142 and an idler wheel 144 complete the supporting path for the loop of magnetic tape 134. A tape drive motor 146 drives the capstan 142 and the tape drive motor 146 is shown on the same side of the supporting plate 128 as the tape drive motor 126. A write head structure 148 is used to write the magnetic information on the tape loop 134 and a supporting member 150 insures proper contact between the write head structure 148 and the loop of magnetic tape 134. The write head structure 148 may include a plurality of recording heads to record a plurality of tracks of information on the loop of magnetic tape 134.

As the magnetic tape loops 114 and 134 are driven by the capstans 122 and 142, the write head structures 130 and 148 are provided with input signals so as to record on the magnetic tape loops 114 and 134 information in accordance with the input signals. As the magnetic tape loops 114 and 134 pass the thin films 106 and 108, the information recorded on the magnetic tape loops is transferred to the thin magnetic films 106 and 108. The transfer of information may be more clearly seen in FIGURE 3 wherein portions of the magnetic tape loops 114 and 134 are shown to contain parallel tracks of digital information. The digital information is represented by plusses and minuses. Actually, the digital information may be represented by a direction of magnetization so that a plus represents the magnetization of a point on the magnetic tape loop 114 or 134 in a first particular direction and a minus represents the magnetization of a point on the magnetic tape loop 114 or 134 in a second opposite direction.

As can be seen in FIGURE 3, the magnetic information contained on the magnetic tape loops 114 and 134 is transferred directly from the magnetic tape loops 114 and 134 to the thin magnetic films 106 and 108 deposited on the optical prism structure 104. The thin magnetic films 106 and 108, therefore, each contain a spatial pattern of magnetic information in accordance with the spatial pattern of magnetic information contained on the magnetic tape loops 114 and 134. The magnetic tape loops 114 and 134 serve as pattern generators to supply variable information to the thin magnetic films 106 and 108. Actually, the spatial information moves along the thin magnetic films in accordance with the movement of the magnetic tape loops 114 and 134.

It is to be appreciated that although the embodiment of FIGURE 2 is shown to operate dynamically in that both spatial patterns of magnetic information on the thin films 106 and 108 are variable, either one of the magnetic tape loops could be replaced by a piece of stationary magnetic tape positioned adjacent to the thin magnetic film so as to induce a fixed spatial pattern of magnetic information onto the thin magnetic film. It is also to be appreciated that the correlation provided by the magneto-optical correlator of FIGURE 2 is over an entire area but that the readout may be at individual positions by using a detector such as a vidicon or that the light energy may be concentrated at a single position so as to correlate information along a single track on both thin magnetic films 106 and 108.

As the light energy is reflected from the thin films 106 and 108, the light energy experiences rotations in accordance with the Kerr magneto-optical effect. The particular relationship of the polarizer and the analyzer may be set so that the rotations add or cancel each other so as to provide for a true correlation of the spatial pattern of magnetic information on the thin films 106 and 108. FIGURE 4 illustrates the operation of the correlator of FIGURE 2 and in particular FIGURE 4 is a plot of the light intensity of the light output from the analyzer 110 in relation to the angle of rotation produced by the thin films.

As can be seen in FIGURE 4, the light intensity I is plotted along the vertical axis and the angle of rotation in degrees either clockwise or counter-clockwise is plotted along the horizontal axis. The angle of rotation due to a minus magnetization on the thin films as explained with reference to FIGURE 3 is equal to $\theta^-$. The angle of rotation due to a plus magnetization on the thin films is equal to $\theta^+$. It is to be appreciated that the minus and plus magnetization merely refers to the magnetization of the thin films in one of two opposite directions, as explained above.

The light output I is a cosine function and specifically the light intensity output $I_{out}$ is proportional to the light intensity input $I_{in}$ $(1-\cos^2 \theta)$ where $\theta$ is the angle of rotation produced by the reflection of the light energy from the magnetized surface of the thin films. The particular curve in the area of extinction for the light intensity is shown by curve 200. In order to provide for the complete cancellation of rotation when the magnetization on the two films is unlike, the analyzer is set for the extinction point for the light energy so that polarization rotations in either a plus or minus direction away from the setting point for the analyzer produce equal light intensity.

It is to be appreciated that in the normal operation of a magneto-optical transducer the analyzer may be set at some position other than at the extinction point so as to provide for a maximum light differential for the clockwise and counter-clockwise rotations. However, since it is desirable to provide for a cancellation when the magnetization on the two thin films is unlike, the analyzer of the magneto-optical correlator of the present invention is set at the extinction point.

As can be seen in FIGURE 4, the rotation due to a minus magnetization of either of the thin magnetic films, which is expressed as $\theta^-$, is shown by the line 202. The rotation has been shown to be nominally one-half degree and the intensity of the light output is in accordance with the corresponding position along the curve 200. The rotation due to a plus magnetization of the films, which is expressed as $\theta^+$, is shown by the line 204. This rotation again corresponds to a particular position along the curve 200. When both films have a minus magnetization so as to produce a double counter-clockwise rotation, which is expressed as $\theta^{--}$, the rotations add so as to produce a total rotation as shown by the line 206. This double rotation corresponds to a particular position along the curve 200 so that the intensity of the light output is in accordance with the rotation. When both films have a plus magnetization so as to produce a double clockwise rotation, which is expressed as $\theta^{++}$, the total rotation is shown by the line 208. This double rotation produces a corresponding light output along the curve 200 and the intensity of the light output for both the clockwise and counter-clockwise double rotations is the same.

The intensity of the light output from the analyzer 110 shown in FIGURE 2 is the same when both thin magnetic films produce either a clockwise or counter-clockwise rotation of the beam of light. On the other hand, the rotation due to a minus magnetization of the film 106 and a plus magnetization of the film 108 cancel so that there is no net rotation as shown at position 210. The same cancellation is produced when the rotation is due to a plus magnetiaztion of the film 106 and a minus magnetization of the film 108. The magneto-optical correlator of the present invention, therefore, produces an output signal when the magnetization of the thin magnetic films is in the same direction and does not produce an output signal when the magnetization of the thin magnetic films is in the opposite direction. It is to be appreciated that the analyzer may be set at some other position so as to produce a different relationship of the intensity of the output light due to the clockwise and counter-clockwise rotation, but that a true correlation is produced when the analyzer is adjusted for the zero position as shown in FIGURE 4.

The present invention is, therefore, directed to a magneto-optical correlator which correlates a spatial pattern of information on a first thin magnetic film with a spatial pattern of information on a second thin magnetic film so as to produce a light output signal having a plurality of rotations at particular spatial positions within the beam of light and wherein the rotations correspond to the correlation of the information on the two thin magnetic films.

The magneto-optical correlator of the present invention may be easily operated on a dynamic basis as shown in FIGURE 2 so as to provide a continuous correlation over large areas of information. The time delay between the time the information is recorded and correlated is minimal since the magnetic tape loops 114 and 134 are relatively small. The magneto-optical correlator of the present invention shown in FIGURE 2 is relatively simple in construction. It is, therefore, not necessary with the magneto-optical correlator of the present invention to have expensive photographic processing equipment, nor is the magneto-optical correlator of the present invention limited by the problems en countered with the use of light modulators using the Sears-Debye effect.

It is also to be appreciated that the pattern generator shown in FIGURE 2 and illustrated in particular by the use of magnetic tape loops 114 and 134 may be replaced by pattern generators.

With certain types of light modulators the information is correlated substantially instantaneously after the recording of the information, so that there is no time delay. Also, propagation of the information may be more accurately controlled since the propagation of the information along the thin films is not dependent upon a physical movement of the magnetic tape, as shown in FIGURE 2.

The magneto-optical correlator of the present invention is, therefore, a simple, reliable and relatively inexpensive method of providing correlation of large quantities of information and, although the correlator has been shown and described with reference to a particular embodiment, it is to be appreciated that various adaptations and modifications may be made and that the invention is only to be limited by the appended claims.

What is claimed is:

1. A magneto-optical correlator, including a first thin magnetic film, first means coupled to the first thin magnetic film for producing a first spatial magnetic pattern on the first thin magnetic film, a second thin magnetic film, a second means coupled to the second thin magnetic film for producing a second spatial magnetic pattern on the second thin magnetic film, and third means for producing a collimated beam of polarized light and for directing the collimated beam of polarized light to the first thin magnetic film and with spatial positions of the collimated beam of polarized light having polarization rotations in accordance with the spatial magnetic pattern on the first thin magnetic film and with the rotated collimated beam of polarized light directed to the second thin magnetic film and with the spatial positions of the rotated collimated beam of polarized light having additional polarization rotations in accordance with the spatial magnetic pattern on the second thin magnetic film to produce an output beam of light having polarization rotations in accordance with the correlation between the first and second spatial magnetic patterns on the first and second thin magnetic films.

2. The magneto-optical correlator of claim 1 additionally including fourth means responsive to the output beam of light having polarization rotations in accordance with the correlation between the first and second spatial magnetic patterns on the first and second thin magnetic films and for producing an output signal having characteristics in accordance with the rotations in the output beam of light.

3. The magneto-optical correlator of claim 1 wherein the polarization rotations of the collimated beam of polarized light are produced by the reflection of the collimated beam of polarized light from the first and second thin magnetic films.

4. A magneto-optical correlator, including
a first thin magnetic film,
first means coupled to the first thin magnetic film for producing a first magnetic pattern of digital information on the first thin magnetic film,
a second thin magnetic film,
second means coupled to the second thin magnetic film for producing a second magnetic pattern of digital information on the second thin magnetic film, and
third means for producing a beam of light and for directing the beam of light to the first thin magnetic film and with spatial positions of the beam of light having polarization rotations in accordance with the magnetic pattern of digital information on the first thin magnetic film and with the rotated beam of light directed to the second thin magnetic film and with the spatial positions of the rotated beam of light having additional polarization rotations in accordance with the magnetic pattern of digital information on the second thin magnetic film to produce an output beam of light having polarization rotations in accordance with the correlation between the first and second magnetic patterns of digital information on the first and second thin magnetic films.

5. The magneto-optical correlator of claim 4 wherein the magnetization of the first and second thin magnetic films is along the easy axis so that the magnetization of the thin magnetic films is in two opposite directions.

6. The magneto-optical correlator of claim 5 wherein the polarization rotations in the beam of light add to each other at spatial positions corresponding to positions of the first and second thin magnetic films where the direction of magnetization is the same and wherein the polarization rotations in the beam of light cancel each other at spatial positions corresponding to positions of the first and second thin magnetic film where the direction of magnetization is opposite.

7. A magneto-optical digital correlator, including
a first magnetic film having a first spatial pattern of discrete digital magnetic information,
a second magnetic film having a second spatial pattern of discrete digital magnetic information,
a second magnetic film having a second spatial pattern of discrete digital magnetic information, and
means for producing a collimated beam of polarized light and for directing the collimated beam of polarized light to the first magnetic film to produce polarization rotations in the light beam in accordance with the first spatial pattern of discrete digital magnetic information and with the rotated light beam directed to the second magnetic film to produce polarization rotations in the rotated light beam in accordance with the second spatial pattern of discrete digital magnetic information and with the polarization rotations produced by the second magnetic film adding to the polarization rotations produced by the first magnetic film at the spatial positions where the discrete digital magnetic information of the first magnetic film is in the same direction as the discrete digital magnetic information of the second magnetic film.

8. The magneto-optical digital correlator of claim 7 wherein the first and second magnetic films are magnetized along the easy axis.

9. The magneto-optical digital correlator of claim 7 wherein the polarization rotations produced by the second magnetic film cancel the polarization rotations produced by the first magnetic film at the spatial positions where the discrete digital magnetic information of the first magnetic film is in the opposite direction of the discrete digital magnetic information of the second magnetic film.

10. A magneto-optical correlator, including
a first magnetic film having first magnetic information,
a second magnetic film having second magnetic information, and
first means for producing polarized light energy and for directing the polarized light energy to the first magnetic film to produce polarization rotations in the light energy in accordance with the first magnetic information and with the rotated light energy directed to the second magnetic film to produce polarization rotations in the rotated light energy in accordance with the second magnetic information and and with the polarization rotations produced by the second magnetic film adding to the polarization rotations produced by the first magnetic information on the first magnetic film with the second magnetic information on the second magnetic film.

11. The magneto-optical correlator of claim 10 additionally including second means responsive to the light energy from the second magnetic film having polarization rotations in accordance with the correlation between the first and second magnetic information on the first and second magnetic films and for producing an output signal having characteristics in accordance with the correlation.

12. The magneto-optical correlator of claim 10 wherein the polarization rotations of the polarized light energy are produced by the reflection of the polarized light energy from the first and second magnetic films.

13. A magneto-optical correlator, including
a first magnetic film having a first spatial magnetic pattern of information,
a second magnetic film having a second spatial magnetic pattern of information, and
means for producing a beam of light and for directing the beam of light to the first magnetic film for reflection from the first magnetic film to the second magnetic film and for reflection from the second magnetic film and with the beam of light having polarization rotations in accordance with the first spatial magnetic patterns on the first and second magnetic films.

14. The magneto-optical correlator of claim 13 additionally including means responsive to the beam of light reflected from the second magnetic film for producing an output signal having amplitude characteristics in accordance with the polarization rotations in the beam of light.

15. The magneto-optical correlator of claim 13 additionally including means for supporting the first and second magnetic films and for producing a total internal reflection of light energy directed to the first and second magnetic films.

16. A magneto-optical correlator, including
a first magnetic film having first magnetic information,
a second magnetic film having second magnetic information, and
means for producing light energy and for directing the light energy to the first magnetic film for reflection from the first magnetic film to the second magnetic film and for reflection from the second magnetic film and with the light energy having polarization rotations in accordance with the magnetic information on the first and second magnetic films.

17. The magneto-optical correlator of claim 16 additionally including means responsive to the light energy reflected from the second magnetic film for producing an output signal having amplitude characteristics in accordance with the polarization rotations in the light energy.

18. The magneto-optical correlator of claim 16 additionally including means for supporting the first and second magnetic films and for producing a total internal reflection of light energy directed to the first and second magnetic films.

19. A magneto-optical correlator, including a first optical prism including a first thin magnetic film on one surface of the first optical prism and with the first optical prism producing a total internal reflection of light energy directed to the first thin magnetic film, and a second optical prism including a second thin magnetic film on one surface of the second optical prism and with the second optical prism producing a total internal reflection of light energy directed to the second thin magnetic film and with the second optical prism positioned relative to the first optical prism so that light energy reflected from the first thin magnetic film is directed to the second thin magnetic film.

20. The magneto-optical correlator of claim 19 wherein the first and second optical prisms are integral with each other.

21. The magneto-optical correlator of claim 19 additionally including means coupled to the first and second thin magnetic films for producing spatial patterns of magnetic information on the first and second thin magnetic films.

22. A magneto-optical correlator, including a first optical prism, a first thin magnetic film on one surface of the first optical prism and with the first optical prism producing a total internal reflection of light energy directed to the first thin magnetic film, a second optical prism, a second thin magnetic film on one surface of the second optical prism and with the second optical prism producing a total internal reflection of light energy directed to the second thin magnetic film and with the second optical prism positioned relative to the first optical prism so that light energy reflected from the first thin magnetic film is directed to the second thin magnetic film, first means coupled to the first thin magnetic film for supplying magnetic information to the first thin magnetic film, second means coupled to the second thin magnetic film for supplying magnetic information to the second thin magnetic film, and third means for producing light energy and for directing the light energy to the first thin magnetic film and for reflection from the first thin magnetic film to the second thin magnetic film and for reflection from the second thin magnetic film and with the light energy from the second thin magnetic film having rotations in accordance with the magnetic information on the first and second thin magnetic films.

23. The magneto-optical correlator of claim 22 wherein the first and second optical prisms are integral with each other.

24. The magneto-optical correlator of claim 22 wherein the first and second means supply spatially distributed magnetic information to the first and second thin magnetic films.

25. The magneto-optical correlator of claim 22 additionally including fourth means responsive to the light energy from the second thin magnetic film for producing an output signal having characteristics in accordance with the polarization rotations in the light energy from the second thin magnetic film.

References Cited

"Kerr Magneto-Optical Elements," by E. W. Pugh, IBM Technical Disclosure Bulletin, vol. 4, No. 8, January 1962, p. 57.

TERRELL W. FEARS, Primary Examiner

U.S. Cl. X.R.

340—173, 174.1; 350—71, 117, 151